United States Patent [19]

Lewiner et al.

[11] Patent Number: 4,893,118
[45] Date of Patent: Jan. 9, 1990

[54] DEVICE FOR IDENTIFICATION BY PROXIMITY

[75] Inventors: Jacques Lewiner, Saint Cloud; Claude Hennion; Didier Leonard, both of Paris, all of France

[73] Assignee: Societe Fontaine, Paris, France

[21] Appl. No.: 125,660

[22] Filed: Nov. 25, 1987

[30] Foreign Application Priority Data

Nov. 25, 1986 [FR] France ................. 86 16393

[51] Int. Cl.⁴ ................. G06K 5/00; H04Q 7/02
[52] U.S. Cl. ................. 340/825.54; 340/825.34; 235/382; 235/382.5
[58] Field of Search ........... 340/825.54, 825.3, 825.31, 340/825.34; 235/382, 382.5, 380, 381, 375

[56] References Cited

U.S. PATENT DOCUMENTS 4,546,241 10/1985 Walton ................. 235/380
4,654,658 3/1987 Walton ................. 340/825.54
4,656,472 4/1987 Walton ................. 340/825.34
4,665,399 5/1987 Fauser et al. ................. 340/825.71
4,724,427 2/1988 Carrol ................. 340/825.54

Primary Examiner—Donald J. Yusko
Assistant Examiner—Brian Palladino
Attorney, Agent, or Firm—Larson and Taylor

[57] ABSTRACT

A reader identifies coded electronic badges without contact with the latter, by simple inductive coupling of inductances, the electrical supply of the badge being ensured from a voltage at high frequency F generated by the reader. The code of the badge, composed of a sequence of bits following one another at a frequency f very much less than F, is used to modulate a voltage of intermediate frequency fi comprised between f and F and the thus modulated voltage controls an electronic switch adapted to short-circuit a resonant circuit of the badge.

4 Claims, 2 Drawing Sheets

DEVICE FOR IDENTIFICATION BY PROXIMITY

BACKGROUND OF THE INVENTION

The invention relates to devices enabling the identification of objects at a short distance from the latter, without direct contact with them, and comprising on the one hand an interrogator-reader member, also referred to as a "reader" below, arranged so as to generate an alternating voltage at high frequency F in an inductive impedance and to receive and identify binary response signals appearing in the form of coded sequences of electrical pulses modulating the frequency F and succeeding at a frequency of formation f less than F, sequences applied inductively on said impedance, and on the other hand an electronic identification circuit mounted on each object to be identified, said circuit, also referred to as below "badge" below, being adapted to be inductively coupled to the above impedance by simple mutual approach, to be supplied electrically by the single alternating voltage F due to the simple fact of this coupling and to form response signals of the type indicated above, specific to the badge concerned, applicable to the reader by said coupling.

Such devices have, for exaple, been described in the U.S. Pat. No. 3,299,424.

These devices lend themselves particularly well to the following application: the reader is associated with a security apparatus of which it is desired to control the actuation, an apparatus such as a money distributor or an access lock to a protected premises, and the object to be identified is a portable card allocated to a user used to carrying out said actuation.

In such a case, to perform such actuation, it suffices for the user to bring his card up to the reader, the necessary inductive coupling being obtained without the approach being performed until actual contact between the card and the reader: in particular it is unnecessary here to introduce the card into a slot specially provided in said reader.

Such a technique is advantageous in that it relates not only to the simplicity and rapidity of the actuation, but also the possibility of providing the reader externally with a continuous protective which is not perforated nor slotted and thus is particularly resistant to vandalism.

Devices of the above type at present known have a certain interest, but their performance is limited in several areas such as the sensitivity afforded thereby and in the inability with such devices to provide miniaturization of the badges associated with the objects to be identified.

These limitations arise from the techniques adopted with respect to the supply of power to each badge and with respect to the structure of binary coded response signals.

According to this technique, it is the voltage developed at the terminals of a resonant circuit comprising the inductive coupling impedance of the badge which is used both for the supply of this badge and for the inductive transmission of the coded response signals to the reader.

This voltage, which is formed by short circuiting by means of an electronic switch the above resonant circuit in a sequence or rate programmed according to the code to be identified, appears in the form of a train of coding pulses succeeding each other at the frequency f and modulating the frequency F.

Only the portions of large amplitude of this pulse train, corresponding to the periods outside short circuiting can be used for the supply, which places in operation the charging of a filtering capacitor, this capacitor thereafter discharging during the short circuits.

If therefore the duration of the short circuits is too great, there is the risk of the supply being disturbed.

Now this duration cannot be lowered below a predetermined limit due to the fact on one hand that the frequency F is limited upwards (particularly to a value of the order of 150 kHz), for reasons of congestion of Hertzian space and that on the other hand the modulation of each of the bits composing the binary signals must be fairly precise to permit precise detection of the beginnings and ends of these bits.

Several proposals have been made to attempt to overcome this drawback.

For example, it has been proposed in the patent U.S. Pat. No. 4,196,418 to divide the time into cycles of two periods each succeeding each other at a frequency g less than f, the first period of each cycle being used for the supply of power to the badge and the second period, for the formation and the transmission of coded response signals.

This technique also offers numerous drawbacks such as the considerable bulk of the supply capacitor necessary and the obligation of limiting the length of the coded signals if it is desired to avoid the necessity of dividing them up so as to distribute them over several successive coding periods.

It has also been proposed in U.S. Pat. No. 4,333,072 to short-circuit a resistance which is not in the resonating circuit of the badge, which limits all the more the discharge of the supply capacitor.

This solution has the drawback of considerably reducing the signal/noise ratio or more precisely the ratio between the respective amplitudes of the portions, of the coded binary signals corresponding respectively to the 0 bits and to the 1 bits, which reduces all the more the sensitivity of the identification.

GENERAL DESCRIPTION OF THE INVENTION

It is a particular object of the invention to eliminate these various drawbacks by permitting in particular the use of a supply capacitor of a relatively small capacitance and hence a small bulk or size, and becoming independent on the one hand of the limits of duration for the short circuits of the resonant circuit and, on the other hand, of the limits of length for the coded signals.

Accordingly, the identification devices according to the invention are essentially characterized in that they comprise:

in each badge, means to modulate through the coded signals to be transmitted an alternating voltage of an intermediate frequency $f_i$ comprised between the frequencies f and F, this intermediate frequency $f_i$ being of the order of 5 to 20 times greater than the frequency f and of the order of 5 to 20 times smaller than the frequency F, and to apply the thus modulated voltage to the electronic switch for the purposes of actuating the latter, and, in the reader, means for demodulating from said frequency $f_i$ the coded signals received, after their demodulation from the frequency F.

In prefered embodiments, recourse is had in addition to one and/or other of the following features:

the intermediate frequency $f_i$ is of the order of 10 kHz,

- each badge comprises a circuit adapted to transform the input voltage $V_e$ at frequency F into a continuous voltage U, a counter receiving the voltage $V_e$ after its squaring and comprising several stages of dividing by 2 adapted to form, from said voltage $V_e$, output voltages $V_i$ at the frequencies $f_i$, $V_o$ at the frequency f and $V_r$ at a repetition frequency $f_r$, a shifting register controlled by the voltage $V_o$, by brief pulses themselves generated by derivation from the voltage $V_r$, and by the voltage U through a member programmed as a function of the identification code, an AND gate to the two inputs of which are applied respectively the voltage $V_i$ and the output voltage of the shifting register, representative of the code, and an electronic switch controlled by the output from said gate and mounted so as to short-circuit the resonant circuit of the badge.

The invention comprises, apart from these main features, certain other features which will preferably be used at the same time and which will be more explicitly discussed below.

In the following, a prefered embodiment of the invention will be described with reference to the accompanying drawings to be considered, of course, as in no way limiting.

DESCRIPTION OF PREFERRED EMBODIMENTS

Figure 1:
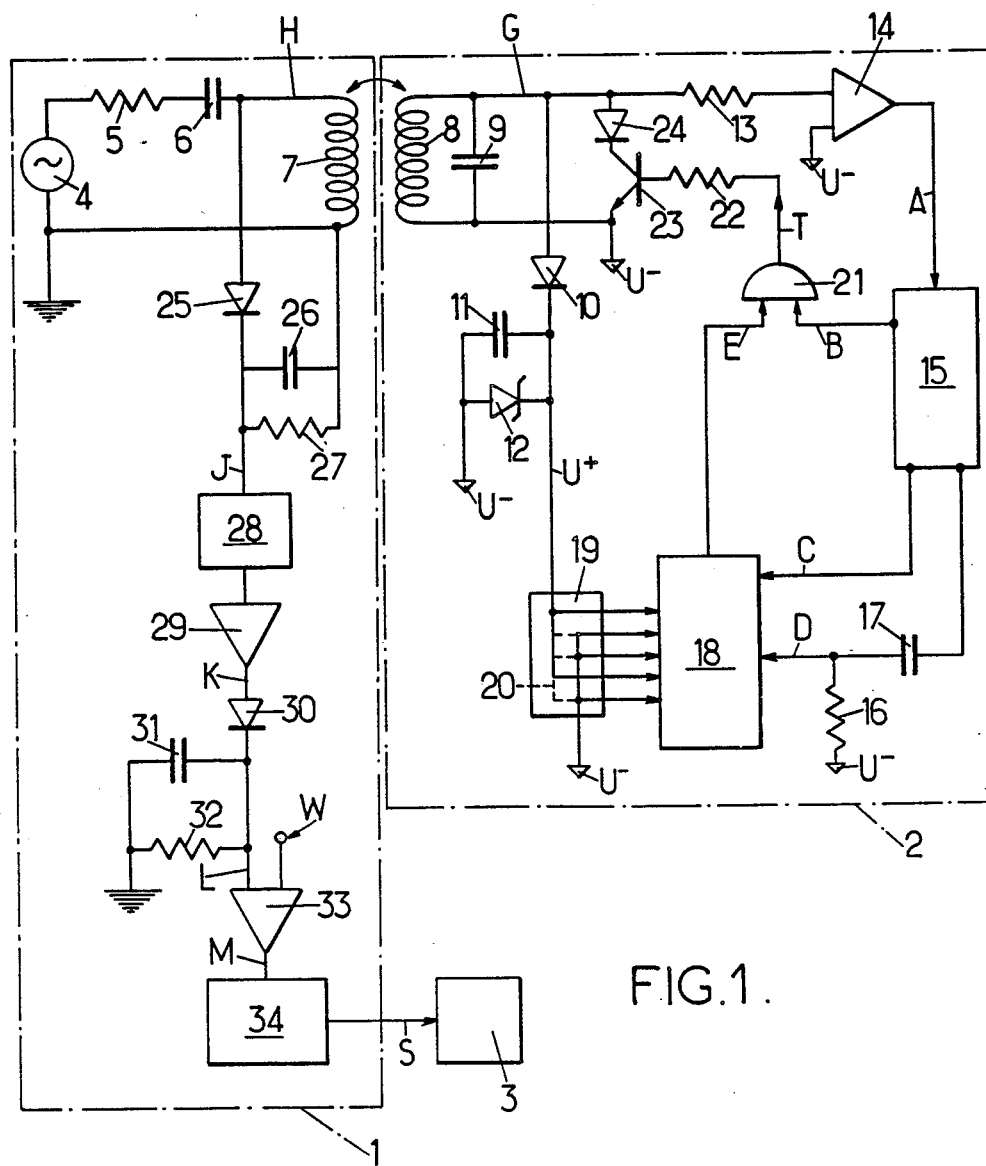
FIG. 1 of these drawings is a diagram of an identification device contructed according to the invention.

The embodiment concerned comprises a fixed interrogator-reader which will be denoted more simply by the word "reader" in the following.

This reader is arranged so as at the same time to supply at a distance by inductive coupling electronic coding circuits mounted on objects to be identified, to interrogate these circuits and to "read" the coded response signals received from said circuits.

To simplify matters, the circuits concerned will be denoted by the word "badges" in the following.

The reader 1 is associated with a security apparatus 3 to which it delivers electrical control signals S when the reading carried out reveals that the code of the badge identified is one of those accustomed to said control.

By way of nonlimiting example, the apparatus 3 concerned may be a lock and the control signals may enable this lock to be unlocked.

The objects on which the identification badges 2 are mounted are themselves easy to transport and to manipulate, such as plastified cards and they are held exclusively by bearers accustomed to operations of the apparatus 3.

The reader 1 comprises a sine wave electrical voltage generator 4 of relatively high frequency F (for example of the order of 100 to 150 kHz) and a circuit comprising a resistor 5, a capacitor 6 and an inductance—capacity 7 supplied in series by this generator, this circuit being tuned to the frequency F.

The badge 2 also comprises a circuit comprising an inductance 8 and a capacitance 9 tuned to the frequency F.

It is the two inductances 6 and 8 which enable the inductive coupling of the reader 1 to be effected with the badge 2 by their simple mutual approach, the whole then forming an air transformer.

In such coupling, the magnetic field produced by the current which passes through each of these inductances 6 and 8 produces an induced voltage in the other inductance.

An interaction is then observed between the latter and the voltages resulting from this interaction are employed simultaneously to supply the badge electrically to interrogate the latter and to transmit in return the coded response signals developed by the badge, which signals are then read and identified by the reader, as will be explained below.

To form the continuous voltage U necessary for the electrical supply of the badge, the sine wave voltage $V_e$ collected at the terminals of the oscillating circuit formed by components 8, 9 is rectified by a diode 10, stored in a filtering capacitor 11 and regulated by a Zener diode 12.

The positions of the badge 2 where there are applied respectively the negative pole (which can be ground) and the positive pole of this voltage U are denoted respectively in FIG. 1 by the symbols U− and U+.

Figure 2:
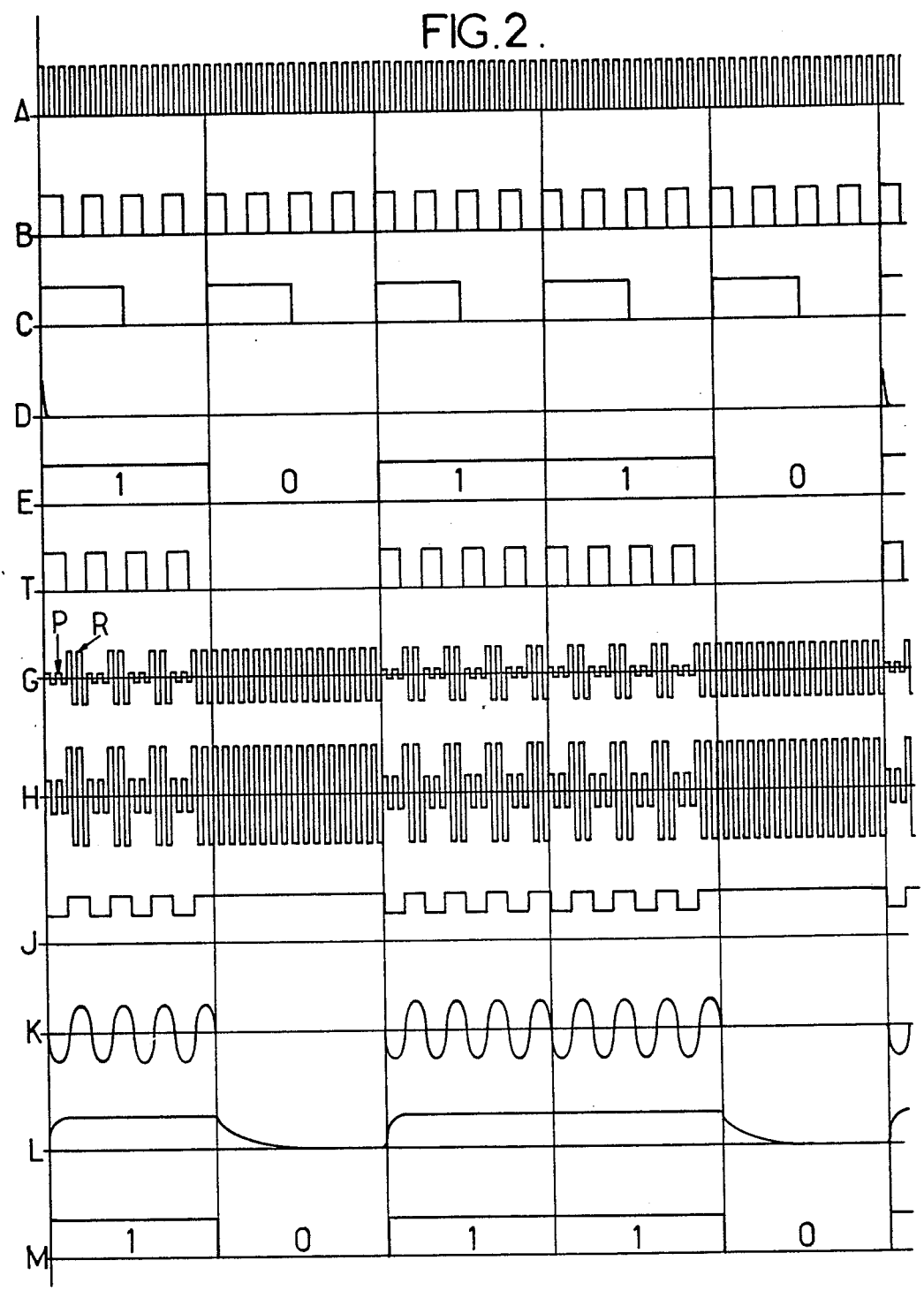
FIG. 2 shows the form of the voltages which are developed at a certain number of points of this device in the course of its operation.

The sine wave voltage $V_e$ is besides sent through a current limiter resistor 13 to an input of a comparator 14 whose other input is supplied with U−, which gives a square voltage A of frequency F as shown in FIG. 2.

The voltage A is sent into a counter 15 comprising several 2-divider (divide-by-two) stages.

This counter 15 generates the voltages:

$V_i$ at an intermediate frequency $f_i$, collected on an output B, $V_o$ at the production frequency f of the coding bits, a voltage collected at an output C, and $V_r$ at a repetition frequency $f_r$ of the coding signals.

This latter voltage $V_r$ passes through derivation circuit which comprises a resistance 16 and a capacitor 17 and which produces a succession of brief pulses of frequency $f_r$ and collected at D.

A shifting register or shift register 18—advantageously composed of a succession of cascade stages—is connected on the one hand to the above leads C and D, and on the other hand, respectively, to the positive U+ and negative U− poles through a programmer 19 adjusted according to the identification code attributed to the badge.

This programmer 19 is advantageously constituted by a printed circuit comprising a plurality of conducting paths connected to the inputs of the shifting register 18 and connectable as desired to the pole U+ or to the pole U− by the supression of undesirable connections, which connections have been shown by interrupted lines 20.

In this way there is obtained at the output E of the shifting register 18 a coded train of binary pulses alternating at the frequency f, which train is repeated at the frequency $f_r$, as seen at E in FIG. 2.

In the example illustrated in this FIG. 2, this train comprises the succession of the following bits: 1 0 1 1 0.

The lead E is connected to one of the two inputs of an AND gate 21 whose other input is connected to the lead B.

In this way at the output of this gate 21 a voltage T of frequency $f_i$ is collected which is modulated as all or nothing by the coded signal to be transmitted to the reader 1.

- This voltage T controls, through a resistor 22, an electronic switch constituted by a transistor 23.

A diode 24 enables a direct polarisation of the collector-base junction of this transistor 23 to be avoided.

The actuation of the transistor 23 by the coded and modulated voltage T short circuits by resonant circuit formed by components 8, 9 of the badge, at the rhythm (frequency) of this voltage, on a very low charge, which charge is constituted only by the transistor 23 and the diode 24.

Each change in state of the switch 23—whether this is its closing ensuring the short circuit mentioned or its opening—generates a variation of the impedance mounted in parallel on the resonant circuit formed by components 8, 9, and hence a concomitant variation of the voltage developed at the terminals of the impedance 8: the latter voltage has the form illustrated at G in FIG. 2.

The variations of this voltage induce in their turn variations of the same type developed at the terminals of the impedance 7 of the reader, when the two inductances 7 and 8 are sufficiently close to one another to be inductively coupled: the shape of the latter voltage is to be seen at H in FIG. 2.

In the reader 1, said voltage H is first demodulated from the frequency F by a circuit composed of a diode 25, a capacitor 26 and a resistor 27.

The so-demodulated signal, whose shape is shown at J in FIG. 2, is the filtered by a band filter 28 centered on the frequency $f_i$.

The signal emerging from the filter 28 and amplified by an amplifier 29 then has the shape seen at K.

This signal is then demodulated from the frequency $f_i$ by a circuit composed of a diode 30, a capacitor 31 and a resistor 32, which generates a signal having the shape L.

The latter signal is compared with a continuous reference voltage W in a comparator 33, which confers on the signal collected at the output from this comparator, a shape, seen at M, corresponding exactly with that of the coded binary signal E emerging from the shifting register 18 of the badge 2.

It is the last binary signal which is transmitted to a decision member or circuit 34 adapted to compare the code received with at least one previously recorded code, so as to emit an actuating signal S in the hypothesis that the comparison carried out would reveal an identity.

Of course the assembly constituted by the elements 15–21 above is only one non-limiting example of an embodiment.

This assembly may be replaced by any other capable of transforming an alternating voltage of the type shown at A into the voltage seen at T, that is to say into a voltage of frequency $f_i$ modulated to all or nothing by the code to be identified.

Such an assembly may be, for example, constituted by a minicomputer or by a prediffused circuit manufactured on request and comprising on the same substrate the totality of the necessary logic gates.

In all cases, the coded signal developed by the badge no longer presents, at the level of the inductances coupled with one another, in a form of a sequence of "blocks" of relatively large or relatively small amplitude according as the electronic switch is open or closed, said blocks modulating the frequency F and following one another at a relatively low frequency, namely less than or equal to the formation frequency f.

Said coded signal is again composed here of a sequence of "blocks" modulating the frequency F and following each other at the formation frequency f but, among these blocks, those corresponding to the opening of the electronic switch (namely the column of 0's in FIG. 2) preserve the shape at large amplitude that they had previously, but those corresponding to the closing of said switch (column of 1's) are here chopped to the intermediate frequency $f_i$, each of them being thus composed of a succession, at said frequency $f_i$, of pairs of mini-blocks each comprising a mini-block P of small amplitude and a mini-block R of large amplitude.

As a result, in all cases, i.e. both during the transmission of a 1 bit and during the transmission of a 0 bit from the badge to the reader, there is no longer a risk of the supply of the badge being disturbed.

In fact, even in the most unfavourable case, that is to say during the transmission of the 1's in the present example, said supply is maintained permanently at a correct level due to the fact that the large amplitude of the voltages at the terminals of the inductances is then preserved on the one hand during half the total time and on the other hand in the course of very brief isolated periods: it results from this double reason that the filtering capacitor always remains sufficiently charged and there is no time to discharge to a troublesome degree between the successive arrivals of alternations of small amplitude.

In other words, it is possible to use here filtering capacitors having relatively small capacities and hence of little bulk, which permits excellent miniaturisation of the badges concerned.

In addition, there is complete freedom here from the limits indicated above as regards the "durations of shortcircuits" and the "lengths of the coded signals".

It may be noted also that the "signal/noise ratio" defined above is here very high, which means that the devices concerned here provide good sensitivity and great reliability.

The intermediate frequency $f_i$ is of the order of 5 to 20 times greater than the coding frequency f and of the order of 5 to 20 times less than the frequency F.

This frequency $f_i$ is, for example, of the order of 10 kHz.

In preferred embodiments, these different frequencies f, $f_i$ and F are multiples of one another so that the beginnings and ends of the coding bits can be identified with accuracy.

As a result of which and whatever the embodiment adopted, theere is obtained a device for identification by proximity whose constitution, operation and advantages result sufficiently from the foregoing.

As is self-evident and as emerges besides already from the foregoing, the invention is not limited in any way to those of its types of application and embodiments which have been more especially envisaged: it encompasses, on the contrary, all modifications.

We claim:

1. A device for enabling the identification of an object or objects at a short distance from the latter, without direct contact with the object, and comprising an interrogator-reader member for generating an alternating voltage at a high frequency F, of a value no greater than on the order of 150 kHz, in an inductance and for receiving and identifying binary response signals appearing in the form of coded sequences of electrical pulses modulating the frequency F and following one another at a formation frequency f less than F, which sequences are applied inductively to said inductance; and an electronic identification circuit mounted on each object to be identified, said circuit comprising a resonant circuit adapted to be inductively coupled to the said inductance, means for using the voltage collected at terminals of said resonant circuit to provide an electrical supply for the identification circuit, means for forming coded binary signals characteristic of the identification circuit, and an electronic switch, actuated by said binary signals, for short-circuiting the resonant circuit so as to form the said response signals, said identification circuit further comprising means for modulating, using the coded binary signals, an alternating voltage of intermediate frequency $f_i$ which lies between the frequencies f and F, said intermediate frequency $f_i$ being of the order of 5 to 20 times greater than the frequency f and of the order of 5 to 20 times smaller than the frequency F, and for applying the modulated voltage to the electronic switch to control switching thereof, said interrogator-reader member further comprising means for demodulating from said frequency $f_i$ the coded signals received, after demodulation thereof from the frequency F.

2. Identification device according to claim 1, wherein the intermediate frequency $f_i$ is of the order of 10 kHz.

3. Identification device according to claim 1, wherein the frequencies f, $f_i$ and F are multiples of one another.

4. Identification device according to claim 1, wherein the identification circuit comprises a circuit for transforming the input voltage, $V_e$, of frequency F into a continuous voltage U, a counter for receiving the voltage $V_e$ after squaring thereof and comprising a plurality of stages providing division by two for developing, from said voltage $V_e$, an output voltage $V_i$ at the frequency $f_i$, an output voltage $V_o$ at the frequency f and an output voltage $V_r$ at a repetition frequency $f_r$, a shift register controlled by the voltage $V_o$, by brief pulses themselves generated by the derivation of the voltage $V_r$ and by the voltage U through a programmed member as a function of the identification code, an AND gate having two inputs to which are applied respectively the voltage $V_i$ and the output voltage of the shift register, representative of the code, said electronic switch for short-circuiting the resonant circuit of the identification circuit being controlled by the output of said gate.

* * * * *